US009803702B2

(12) United States Patent
Heubner (10) Patent No.: US 9,803,702 B2
(45) Date of Patent: Oct. 31, 2017

(54) HYDRAULIC ACTUATING DEVICE FOR ACTUATION OF AT LEAST ONE FRICTION CLUTCH AND AT LEAST ONE GEAR SETTING ELEMENT IN A MOTOR VEHICLE

(71) Applicant: FTE automotive GmbH, Ebern (DE)

(72) Inventor: Wilhelm Heubner, Itzgrund (DE)

(73) Assignee: FTE automotive GmbH, Ebern (DE)

( * ) Notice: Subject to any disclaimer, the term of this patent is extended or adjusted under 35 U.S.C. 154(b) by 855 days.

(21) Appl. No.: 14/149,907

(22) Filed: Jan. 8, 2014

(65) Prior Publication Data

US 2014/0124323 A1    May 8, 2014

Related U.S. Application Data

(63) Continuation-in-part of application No. 13/541,070, filed on Jul. 3, 2012, now Pat. No. 9,476,431.

(30) Foreign Application Priority Data

Jan. 9, 2013   (DE) .................. 10 2013 000 157

(51) Int. Cl.
    *F16H 61/30*   (2006.01)
    *F16D 48/02*   (2006.01)
    (Continued)

(52) U.S. Cl.
    CPC ............... *F16D 25/14* (2013.01); *F15B 7/08* (2013.01); *F15B 11/122* (2013.01); *F16H 61/30* (2013.01);
    (Continued)

(58) Field of Classification Search
    CPC ...... F16H 63/32; F16H 63/34; F16H 61/0021; F16H 63/3023; F15B 7/08
    See application file for complete search history.

(56) References Cited

U.S. PATENT DOCUMENTS 5,048,656 A * 9/1991 Braun ..................... B60T 17/16
                                                     192/114 R
5,850,898 A * 12/1998 Bohme .................. B60K 23/02
                                                      192/54.3
(Continued)

FOREIGN PATENT DOCUMENTS

DE        43 09 901 A1    9/1994
DE        196 33 420 A1   3/1997
(Continued)

OTHER PUBLICATIONS

Chinese Office Action dated Dec. 16, 2015; Application No. 201310727031.2 with translation; 12 pages.
(Continued)

*Primary Examiner* — Logan Kraft
*Assistant Examiner* — Abiy Teka
(74) *Attorney, Agent, or Firm* — Reising Ethington, P.C.

(57) ABSTRACT

A hydraulic actuating device for a friction clutch and a gear setting element has a power unit for pressure generation by use of an electrically driven pump. Gear setting and clutch actuating sections are hydraulically connected to the power unit. A detenting device with a blocking element is associated with a piston of the clutch setting cylinder, which is operatively connected with the friction clutch and can be hydraulically loaded on opposite sides. The blocking element is resiliently biased into a blocking setting preventing piston movement and is movable by an actuator from the blocking setting into a release setting permitting piston movement. The pump is reversible in order to load the piston on one or the other side for an actuating movement. The control unit coordinates activation of the pump and actuator in order to disengage or engage the friction clutch.

21 Claims, 5 Drawing Sheets

(51) Int. Cl.
*F15B 11/12* (2006.01)
*F16H 63/34* (2006.01)
*F15B 7/08* (2006.01)
*F15B 7/00* (2006.01)

(52) U.S. Cl.
CPC .............. *F16H 63/34* (2013.01); *F15B 7/006* (2013.01); *F15B 2211/20515* (2013.01); *F15B 2211/20561* (2013.01); *F15B 2211/27* (2013.01); *F15B 2211/6336* (2013.01); *F15B 2211/665* (2013.01); *F15B 2211/6651* (2013.01); *F15B 2211/7053* (2013.01); *F15B 2211/7054* (2013.01); *F15B 2211/7128* (2013.01); *F15B 2211/72* (2013.01); *F15B 2211/785* (2013.01)

(56) References Cited

U.S. PATENT DOCUMENTS

| | | |
|---|---|---|
| 5,857,381 A | 1/1999 | Mentink |
| 6,116,391 A | 9/2000 | Kremmling et al. |
| 6,497,215 B1 | 12/2002 | Gaessler et al. |
| 6,626,056 B2 | 9/2003 | Albert et al. |
| 7,614,223 B2 | 11/2009 | St. Aubin et al. |
| 7,938,037 B2 | 5/2011 | John et al. |
| 8,469,851 B2 | 6/2013 | Demir |
| 8,667,859 B2 | 3/2014 | Engel et al. |
| 2009/0007626 A1 | 1/2009 | Bochen et al. |
| 2012/0312655 A1 | 12/2012 | Heubner |
| 2013/0008156 A1 | 1/2013 | Heubner et al. |

FOREIGN PATENT DOCUMENTS

| | | | |
|---|---|---|---|
| DE | 199 00 852 A1 | 7/1999 | |
| DE | 19900852 A1 * | 7/1999 | ............. F16H 61/30 |
| DE | 103 60 611 A1 | 7/2005 | |
| DE | 102006014280 A1 * | 8/2007 | ......... F16H 61/0021 |
| EP | 1 136 309 B1 | 11/2006 | |
| EP | 1 544 492 B1 | 7/2007 | |
| GB | 2 266 934 A | 11/1993 | |
| JP | 57-159005 U | 6/1982 | |
| JP | 2-48666 U | 4/1990 | |
| JP | 2008-121796 A1 | 5/2008 | |
| WO | WO 2007/039084 A1 | 4/2007 | |

OTHER PUBLICATIONS

Japanese Office Action, Application No. 2014-002369; dated Aug. 25, 2015 with translation; 9 pages.

* cited by examiner

HYDRAULIC ACTUATING DEVICE FOR ACTUATION OF AT LEAST ONE FRICTION CLUTCH AND AT LEAST ONE GEAR SETTING ELEMENT IN A MOTOR VEHICLE

TECHNICAL FIELD

The present invention relates to a hydraulic actuating device for actuation of at least one friction clutch and at least one gear setting element in a motor vehicle. Actuating devices of this kind are used in large numbers in modern motor vehicles when it is required to actuate gear setting elements, such as selector forks and selector sleeves, with or without synchromesh, and (dry or wet) friction clutches, in automatic gearboxes, twin-clutch or multiple-clutch gearboxes or separable distributing and differential gearboxes as flexibly and with as little friction as possible as well as within a small space.

PRIOR ART

A hydraulic actuating device for actuation of a friction clutch and setting elements for gear or shift-track selection in a motor vehicle automatic transmission is known from DE-A-103 60 611. According to this prior art, the actuating device has a power unit for generating a hydraulic pressure by a pump, which can be driven by an electric pump drive, in order to displace hydraulic fluid in a pumping direction and in that case to charge a pressure store separated from the pump by way of a non-return valve. Hydraulically connected with the power unit by way of a plurality of electromagnetically actuable valves are a gear setting section with a multiple setting cylinder system for the setting elements for gear or shift-track selection in the transmission and a clutch actuating section with a master unit and a clutch setting cylinder having a piston which is operatively connected with the friction clutch. Also provided is an electronic control system which is electrically connected with the pump drive and the electromagnetically actuable valves as control elements for the gear setting section and the clutch actuating section.

Advantageously, only one power unit, which supplies both the gear setting section and the clutch actuating section with hydraulic pressure, is provided in the prior art. However, a disadvantage of the prior art with a pressure store in the power unit can be seen in that when charging of the store is carried out the hydraulic fluid has to be pumped to a pressure level far above the maximum pressure necessary in the clutch actuating section so as to still be able to offer the requisite working pressure after removal of the required amount, which is disadvantageous in terms of energy and significantly reduces the efficiency of the device. In addition, the electromagnetically actuable valves, which are executed as slide valves and which represent the largest cost factor within this actuating device, require a high level of oil purity due to the narrow gaps and frequently necessary filtration measures. Nevertheless, the slide valves are subject to a not inconsiderable level of leakage, which over a corresponding period of service leads to complete discharging of the pressure store with the consequence of delay of the first actuation by the charging time of the pressure store. In addition, when driving without gear changing, for example on the motorway, recharging of the pressure store is therefore needed at regular intervals, which is similarly disadvantageous in terms of energy.

What is needed is to provide for actuation of at least one friction clutch and at least one gear setting element in a motor vehicle, a hydraulic actuating device which avoids the above disadvantages and by comparison with the prior art has a significantly improved overall efficiency with lower costs.

SUMMARY OF THE INVENTION

According to one aspect of the invention, a hydraulic actuating device for actuation of at least one friction clutch and at least one gear setting element in a motor vehicle includes a power unit for generating a hydraulic pressure via a pump, which is drivable by way of an electric pump drive, in order to displace hydraulic fluid in a pumping direction. It also has a gear setting section with a gear setting cylinder for the gear setting element which is hydraulically connected with the power unit. A clutch actuating section with a clutch setting cylinder is also hydraulically connected with the power unit. A piston of the clutch setting cylinder is operatively connected with the friction clutch, and a control unit is provided, which is electrically connected with the pump drive and control elements for the gear setting section and the clutch actuating section. A detenting device as a control element is functionally associated with the piston which can be hydraulically loaded on opposite sides of the clutch setting cylinder. The detenting device has a blocking element which is resiliently biased into a blocking setting preventing movement of the piston and which is movable against the resilient bias from the blocking setting into a release setting permitting movement of the piston by an actuator electrically activatable by the way of the control unit. The pumping direction of the pump is reversible in order to hydraulically load the piston of the clutch setting cylinder on one or the other side thereof for an actuating movement depending on the respective pumping direction. The control unit coordinates the electrical activation of pump drive and actuator in order to disengage and engage the friction clutch.

The coordination of pump drive and actuator can be carried out by the control unit so that initially the actuator of the detenting device is electrically activated in order to bring the blocking element from its blocking setting, which without power prevents movement of the piston of the clutch setting cylinder, into its release setting so that the detenting or blocking of the piston produced by the detenting device is cancelled. The control unit then electrically activates the pump drive so as to start the reversing pump with the desired pumping direction, whereupon the hydraulic pressure acting on the corresponding side of the piston of the clutch setting cylinder produces movement of the piston in a predetermined direction so as to actuate the friction clutch operatively connected therewith. As soon as the piston has now reached the desired position which, for example, can be detected by way of a travel sensor at the clutch setting cylinder, supply of power to the actuator of the detenting device is terminated and the pump drive is switched off by the control unit. As a consequence, the blocking element is returned by virtue of the resilient bias to its blocking setting preventing movement of the piston.

As an alternative thereto the pump drive and actuator of the detenting device can also be so coordinated in operation by the control unit that initially the actuator is electrically activated in order to cancel detenting of the piston of the clutch setting cylinder by retraction of the blocking element. The pump is then operated with a defined pumping direction so as to initiate movement of the piston in a predetermined direction and shortly thereafter the actuator is switched to again be power-free so that the resiliently biased blocking element automatically moves into its blocking setting or a detenting takes place as soon as this is possible again as a consequence of the relative position of the participating components (blocking element and piston). The pump is then switched off. No kind of sensing of the piston position or the like is necessary in the case of this alternative.

It is apparent that the proposed hydraulic actuating device operates very favorably in terms of energy with comparatively low outlay on technical hardware and thus low costs, particularly in the actuation of the friction clutch, because power supply of the electrical components has to be carried out only when actuating movement of the piston of the clutch setting cylinder is required for disengaging or engaging the friction clutch, which is otherwise prevented from movement by the blocking element of the detenting device. There is just as little need for any form of store, which has to be charged, in the power unit or slide valves, and thus an increased level of oil purity, as there is for 'maintenance under pressure' of the clutch setting cylinder. Since, in addition, it is always necessary to activate two elements, pump drive and actuator of the detenting device, in order to initiate a movement it is, finally, advantageous that security against faulty actuation is increased.

In principle, it is possible to provide the detenting device at a component which for production of the operative connection with the friction clutch is connected with the piston of the clutch setting cylinder, for example a piston rod. However, with respect to low constructional outlay and a compact arrangement it is preferred if the detenting device is mounted on the clutch setting cylinder in such a manner that the blocking element cooperates with blocking sections at the piston of the clutch setting cylinder in order to keep the piston in a rest setting or an actuation setting or to release it from the respective setting; consequently, not only a functional, but also a physical association of the detenting device with the piston of the clutch setting cylinder is provided. In that connection, the blocking sections at the piston of the clutch setting cylinder can be formed in simple manner by axially spaced-apart recesses, optionally also in the form of encircling radial grooves, at the piston circumference.

In a preferred form of embodiment of the invention for use in a twin-clutch or multiple-clutch gearbox the piston of the clutch setting cylinder can be operatively connected on each of two opposite sides with a respective friction clutch, so that one friction clutch or the other friction clutch is selectably actuable by only one clutch setting cylinder.

If travel information is needed for the said coordination of the electrical activation of pump drive and actuator and/or for other purposes then the clutch setting cylinder can comprise a sensor device for detecting the position of the piston, preferably with a sensor arranged at the cylinder housing and a signal element attached to the piston.

It is additionally preferred if the electrically activatable actuator is an electromagnetic actuator, as they are commercially available cheaply and without difficulty. Since the electrical activation of the actuator always takes place only briefly, in particular when an actuating movement of the piston of the clutch setting cylinder is desired, the energy balance is advantageous.

In principle, it is also possible to design the operative connection of the piston of the clutch setting cylinder with the friction clutch so that a direct mechanical coupling is provided by, for example, a piston rod. However, particularly with regard to a high level of flexibility, which concerns the physical arrangement of the participating components, it is preferred if the piston of the clutch setting cylinder is mechanically coupled on at least one side with a master piston of the clutch master cylinder. The clutch master cylinder is hydraulically connected by way of a pressure line with a clutch slave cylinder having a slave piston. The clutch slave cylinder in turn is mechanically connected with the friction clutch. A hydraulic operative connection thus is present between the clutch master cylinder and friction clutch.

If the hydraulic operative connection can be influenced or controlled then this is of advantage for fine sensitivity of the disengagement and, in particular, engagement of the friction clutch, especially if the latter is a wet friction clutch, which usually has only a very small actuating travel. The actuating device thus can be constructed in such a manner that a fluid reservoir for hydraulic fluid is associated with the clutch master cylinder in a manner known per se, in which case, starting from the clutch master cylinder, a non-return valve blocking in the direction of the clutch master cylinder and an electromagnetically actuable proportional throttle valve (which in principle can be biased into a transition zero setting or blocking zero setting), which is connected with the fluid reservoir by way of an outflow line and by which the hydraulic pressure in the clutch slave cylinder is settable in defined manner, are connected into the pressure line between the clutch master cylinder and the clutch slave cylinder.

In a variant of this embodiment with a controllable hydraulic operative connection between the clutch setting cylinder and the friction clutch, the proportional throttle valve can be constructed in such a manner that in the non-activated state it is in a transition zero setting, so that no pressure can be built up in the clutch slave cylinder without power supply to the proportional throttle valve. Since two elements (pump drive and proportional throttle valve) thus have to be activated on each occasion in order to initiate actuating movement at the clutch slave cylinder, security against faulty actuation is significantly increased.

In another variant of embodiment with an influenceable hydraulic operative connection between clutch setting cylinder and friction clutch it is, finally, possible to connect between the non-return valve and the proportional throttle valve, which in the non-activated state is in a blocking zero setting, a pressure store into the pressure line, which between the non-return valve and the proportional throttle valve is hydraulically connected with the outflow line by way of a switching valve which blocks in a non-activated state. When the pressure store is charged this enables particularly rapid actuation of the friction clutch, as is desirable for specific applications, so that the overall higher outlay in terms of technical hardware is taken into account in this variant.

BRIEF DESCRIPTION OF THE DRAWINGS

The invention is explained in more detail in the following by way of preferred embodiments with reference to the accompanying, merely schematic drawings, in which the same reference numerals denote the same or corresponding parts and all components are illustrated in the rest setting thereof, i.e. in a non-actuated state, and in which.

A more detailed illustration or explanation of the gear setting elements (for example, selector sleeves or selector rods with selector forks) and (dry or wet) friction clutches, which are to be actuated, has been dispensed with in the drawings and in the following description because these elements and the function thereof are sufficiently known to the expert and explanations with respect thereto do not appear necessary for an understanding of the present invention.

DETAILED DESCRIPTION OF THE EMBODIMENTS

Figure 1:
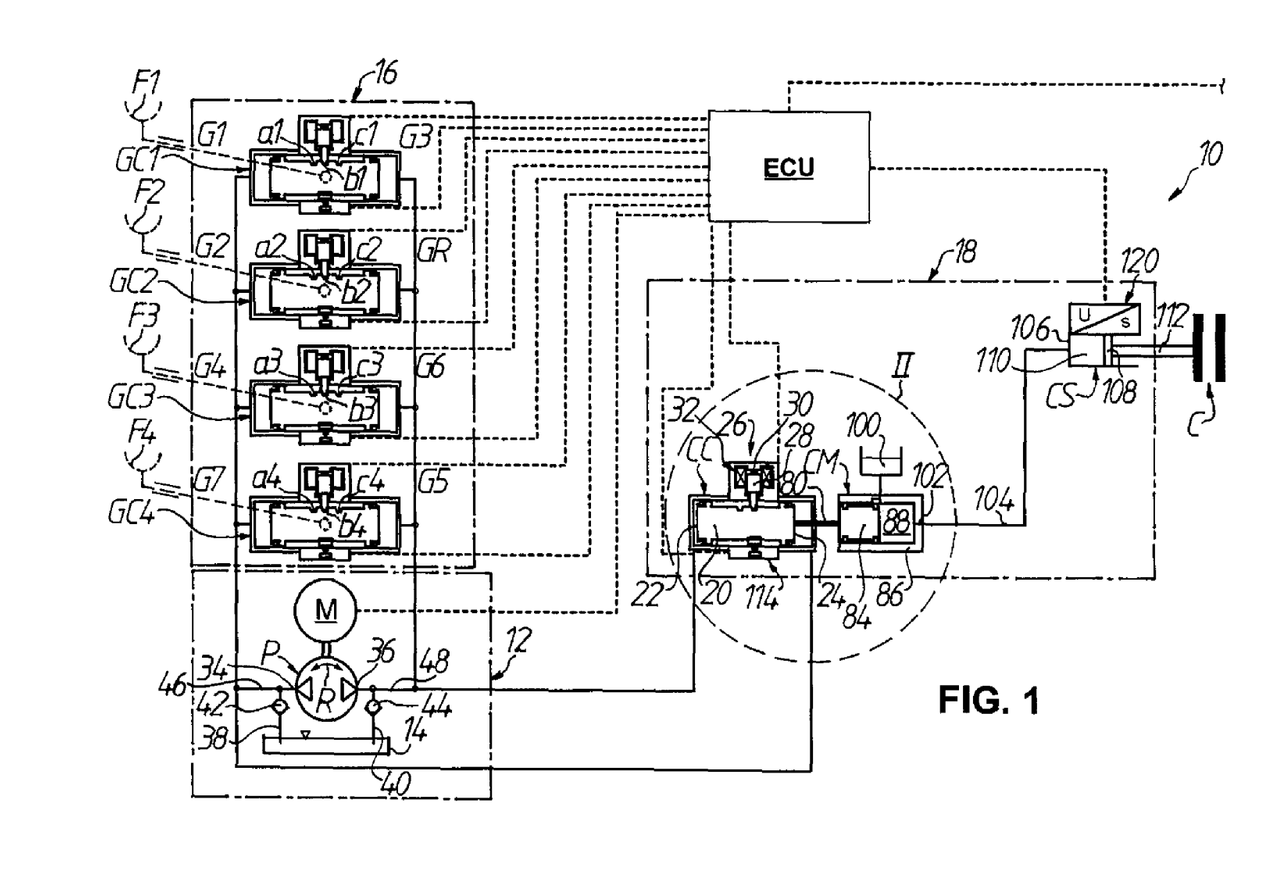
FIG. 1 shows a circuit diagram of a hydraulic actuating device for actuation of a friction clutch by a clutch setting cylinder and of four gear setting elements by a corresponding number of gear setting cylinders, in which the clutch setting cylinder is operatively connected with the friction clutch by way of a serial connection of a clutch master cylinder and a clutch slave cylinder, as a first embodiment according to the invention.

In FIG. 1 the reference numeral 10 indicates in general a hydraulic actuating device for actuation of one or several friction clutches C and at least one gear setting element—in the illustrated embodiment four gear setting elements F1 to F4 are schematically shown by dashed lines as selector rods with selector forks for an automatic transmission with seven forward gears G1 to G7 and one reverse gear GR in a motor vehicle. The actuating device 10 can be roughly divided into three hydraulic sections (each framed by dot-dashed lines). In detail these are: (firstly) a power unit 12 for generating a hydraulic pressure by a pump P, which is connected with a storage reservoir 14 and which can be driven by way of an electric pump drive M in order to displace hydraulic fluid (for example, oil or brake fluid) in a pumping direction R, (secondly) a gear setting unit 16 with gear setting cylinders GC1 to GC4, which are associated with the gear setting elements F1 to F4 and which are hydraulically connected with the power unit 12 and (thirdly) a clutch actuating section 18 with a clutch setting cylinder CC, which is hydraulically connected with the power unit 12 and the piston 20 of which is operatively connected, in a manner still to be described, with the friction clutch C. In addition, a control unit ECU is provided, which is electrically connected (drawn by dashed lines going out from the control unit ECU at the sides and downwardly) with the pump drive M and control elements which are still to be explained in more detail for the gear setting section 16 and the clutch actuating section 18 and which for its part is activated (dashed line above the control unit ECU) by a superordinate transmission control unit (not illustrated).

It is significant that, as will similarly be described in more detail in the following by way of FIGS. 1 and 2, a detenting device 26 with a blocking element 28 is functionally and in the illustrated embodiment also physically associated as a control element with the piston 20 of the clutch setting cylinder CC, which can be hydraulically loaded on opposite sides 22, 24 (double-acting piston-cylinder arrangement), which blocking element is resiliently biased by a spring 30, for example a helical compression spring, into a blocking setting preventing movement of the piston 20 and which can be moved against the resilient bias from the blocking setting into a release setting, which permits or enables movement of the piston 20, by an actuator 32, which is electrically activatable by way of the control unit ECU and which is preferably electromagnetic. In addition, the pumping direction R of the pump P is reversible (indicated in FIG. 1 by a double arrow; so-termed reversing pump) in order to hydraulically load the piston 20 of the clutch setting cylinder CC on one (lefthand effective surface) or the other (righthand effective surface) side 22, 24 thereof for actuating movement depending on the respective pumping direction R, in which case the control unit ECU appropriately coordinates the electrical activation of the pump drive M and actuator 32 in order to disengage or engage the friction clutch C as required (explained in more detail in the following).

The pump P of the power unit 12 has two hydraulic ports 34, 36, of which depending on the respectively selected or by the control unit ECU predetermined pumping direction R one port forms the pump inlet (suction connection), by way of which the hydraulic fluid is sucked in or sucked up, and the other port forms the pump outlet (pressure connection), by way of which the hydraulic fluid is delivered under pressure. Usable pump types are, for example, gearwheel pumps, roller cell pumps, vane cell pumps and radial or axial piston pumps. For the present application it is basically enough if the pump P is constructed as a constant pump which supplies a constant volume flow for a predetermined rotational speed of the pump drive. The pump drive M can optionally be controllable in rotational speed in order to, for example, be able to influence the setting speed of the clutch setting cylinder CC. The power supply to or activation of the pump drive M takes place by way of the supply cable shown in dashed lines in FIG. 1, which cable is electrically connected with the control unit ECU.

Each hydraulic port 34, 36 of the pump P is connected with the storage reservoir 14 by way of a suction line 38, 40 into which a non-return valve 42, 44 blocking in a direction of the storage reservoir is connected. The non-return valves 42, 44 can be biased into their setting blocking in the direction of the storage reservoir 14; however, this is not shown in the figures. In addition, connected with each hydraulic port 34, 36 is a branched-off pressure line 46, 48 providing a hydraulic connection of the power unit 12 with the clutch setting cylinder CC and the gear setting cylinders GC1 to GC4, which are all connected in parallel with respect to the pump P. To that extent, it will be evident to one skilled in the art that when the pump P is operated with, for example, a pumping direction R in clockwise sense in FIG. 1 the pump P sucks hydraulic fluid from the pressure line 46 by way of the hydraulic port 34 and optionally via the non-return valve 42 and the suction line 38 from the storage reservoir 14. By way of its other hydraulic port 36, however, the pump P conveys the hydraulic fluid under pressure in the pressure line 48. In that case the non-return valve 44 prevents a pressure drop or a return flow of the hydraulic fluid to the storage reservoir 14. In analogous manner the pressure line 48 is relieved of pressure, whereas the pressure line 46 is loaded with pressure, when the pump P operates with a pumping direction R in counter-clockwise sense in FIG. 1, in which case hydraulic fluid is conveyed or displaced in FIG. 1 from the right of the pump P to the left of the pump P.

Figure 2:
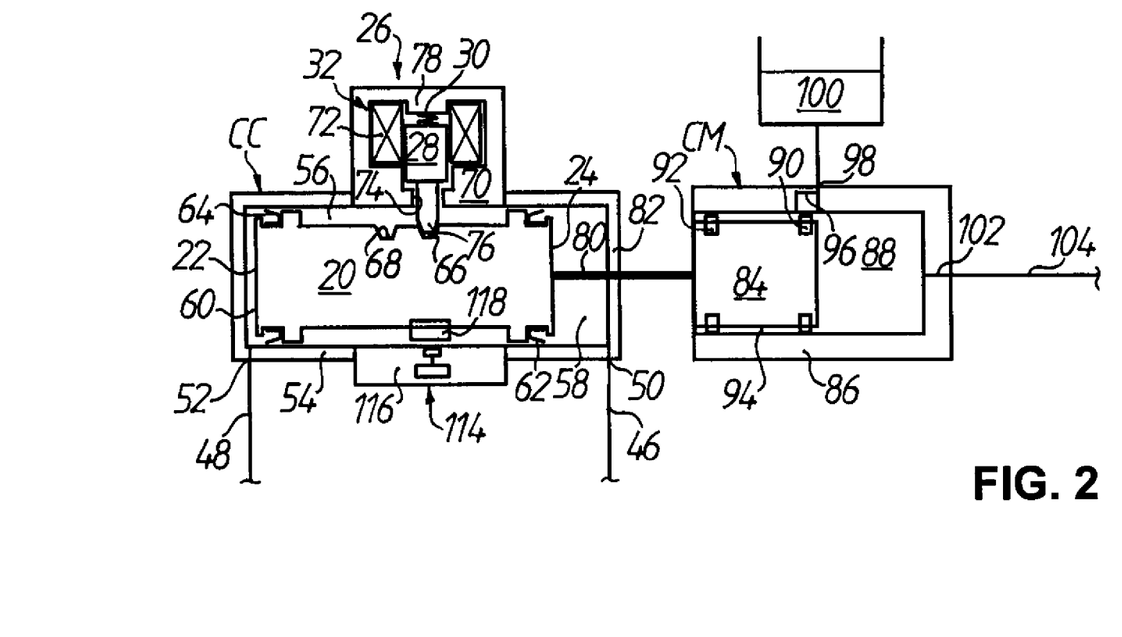
FIG. 2 shows an illustration to enlarged scale of the detail II in FIG. 1, from which, in particular, further details with respect to the clutch setting cylinder can be inferred.

In the clutch actuating section 18 the pressure lines 46, 48 according to FIG. 2 respectively lead to a control or pressure port 50, 52 of the clutch setting cylinder CC. The pressure ports 50, 52 are schematically illustrated in FIG. 2 as channels in a cylinder housing 54 of the clutch setting cylinder CC, which forms a cylinder chamber 56 of the clutch setting cylinder CC, in which the piston 20 separates two pressure chambers 58, 60 from one another. In that case, the piston 20 is provided at each of its two ends at the outer circumference with a respective sealing element 62, 64, for example a groove ring known per se, which cooperates with the inner circumferential surface of the cylinder housing 54 so as to dynamically seal off the respective pressure chamber 58 or 60.

Formed at the piston 20 in a pressure-free region of the cylinder chamber 56 between the sealing elements 62, 64 as seen in axial direction are several, here two, blocking sections with which the blocking element 28 of the detenting device 26 which in the illustrated embodiment is mounted on the clutch setting cylinder CC, more precisely the cylinder housing 54 thereof cooperates in order to keep the piston 20 in a rest setting (as shown) or an actuation setting or to release it from the respective setting, as will be described in more detail in the following. The blocking sections at the piston are, in the illustrated embodiment, axially spaced-apart recesses 66, 68 formed at the circumference of the piston.

The detenting device 26 comprises a housing 70, which in the illustrated embodiment is fixed in suitable manner to the outer circumference of the cylinder housing 54 of the clutch setting cylinder CC. A magnet coil 72 of the actuator 32 is received in the housing 70 and at least in part concentrically surrounds the ferromagnetic blocking element 28, here functioning as an armature of an electromagnetic drive. The blocking element 28 displaceable in the manner of a piston in the magnet coil 72 passes through an opening 74 in the housing 70 so that a detenting projection 76, which is provided at the lower end as shown in FIG. 2 of the blocking element 28 and which slightly tapers in cross-section towards its free end, can enter into engagement with the recess 66 or 68 in the piston 20. At its upper end in FIG. 1, the blocking element 28 is resiliently supported relative to a base region 78 of the housing 70 by way of the spring 30. Power supply of the magnet coil 72 takes place by way of the supply cable shown in dashed lines in FIG. 1 and electrically connected with the control unit ECU.

To that extent it is evident that the spring 30 endeavors to urge the blocking element 28 out of the housing 70 of the detenting device 26 so that in the power-free state of the magnet coil 72 the detenting projection 76 is kept in engagement with one of the recesses 66, 68 at the piston 20 by virtue of the force of the spring 30. As a consequence of the thus-produced mechanically positive couple the piston 20 itself is prevented, when one of the pressure chambers 58, 60 is loaded with pressure, from displacing in the clutch setting cylinder CC. If, thereagainst, the magnet coil 72 is supplied with power then the resulting magnetic force retracts the blocking element 28 against the force of the spring 30 into the housing 70 in a direction substantially perpendicular to the direction of displacement of the piston 20, in which case the detent projection 76 comes free from the respective recess 66 or 68. The piston 20 can now be displaced to the left or the right in FIG. 2 by loading the corresponding pressure chamber 58 or 60 with pressure.

The respective setting of the detenting device 26 (open or detented), i.e. of the blocking element 28 with respect to the housing 70 of the detenting device 26, can be indirectly ascertained by the control unit ECU via the inductivity of the actuator 32, which in the case of movement of the blocking element 28 relative to the housing 70 changes in dependence on the instantaneous air gap, thus the clear spacing between the blocking element 28 and the base region 78 of the housing 70 in the vicinity of the spring 30.

A piston rod 80 is fastened to the piston 20 on the side which is at the right in FIG. 2 and extends in a suitably sealed manner (not shown in more detail) through a wall 82 of the cylinder housing 54 of the clutch setting cylinder CC, the piston rod being connected, to be effective in terms of actuation, with an adjacently arranged clutch master cylinder CM, more precisely mechanically coupled with the master piston 84 thereof.

The clutch master cylinder CM, which is constructed in a manner known per se, comprises a cylinder housing 86, in which the master piston 84 is received to be longitudinally displaceable and bounds a pressure chamber 88. The master piston 84 is provided at the outer circumference with a primary sealing element 90 and a secondary sealing element 92, which dynamically seal relative to an inner circumferential surface of the cylinder housing 86 and bound a breather region 94 therebetween. In the rest setting, which is illustrated in FIG. 2, of the master piston 84 the pressure chamber 88 is in pressure-free connection with the breather region 94 by way of a breather connection 96 disposed in fluid connection with a fluid reservoir 100 by way of a breather port 98. When the master piston 88 is displaced to the right in FIG. 2 the primary sealing element 90 travels beyond the breather connection 96, so that the pressure chamber 88 and the breather region 94 are hydraulically separated from one another and a hydraulic pressure builds up in the pressure chamber 88. Hydraulic fluid can now be displaced from the pressure chamber 88 via a pressure port 102 of the clutch master cylinder CM into a pressure line 104 connected with the pressure port 102.

As shown in FIG. 1, the clutch master cylinder CM is hydraulically connected by way of the pressure line 104 with a clutch slave cylinder CS, which can be a classic slave cylinder or a so-called central release device (annular piston and annular cylinder arrangement with central shaft passage). The clutch slave cylinder CS has, in a known manner, a slave piston 108, which is received in a cylinder housing 106 to be longitudinally displaceable and is suitably dynamically sealed relative to an inner circumferential surface of the cylinder housing 106 and which on one side bounds a pressure chamber 110 hydraulically loadable by way of the pressure line 104 and on its other side is mechanically connected with the friction clutch C at 112.

It will be apparent that when the clutch master cylinder CM is actuated hydraulic fluid is displaced by the master piston 84 from the pressure chamber 88 and, by virtue of the hydraulic connection via the pressure line 104, is pushed in corresponding amount into the pressure chamber 110 of the clutch slave cylinder CS, where, as a consequence, a displacement of the slave cylinder 108 and therewith a disengaging movement at the friction clutch C by way of the mechanical connection 112 take place.

Returning to FIG. 2, in the illustrated embodiment two recesses 66, 68 are provided at the piston 20 of the clutch setting cylinder CC, the axial position of which recesses on the piston 20 and the spacing from one another define specific settings of the master piston 84 operatively connected with the piston 20. If the detenting projection 76 is, as shown in FIGS. 1 and 2, in engagement with the righthand recess 66 at the piston then this defines by way of the coupling produced by the piston rod 80 the rest setting of the master piston 84 and thus also of the slave piston 108; consequently, the friction clutch C is in its unactuated engaged state. If, thereagainst, the detenting projecting 76 detents with the lefthand recess 68 at the piston 20 then this defines an actuation setting of the master piston 84 and thus, by way of the fluid column in the pressure line 104 also of the slave piston 108; the friction clutch C is accordingly in its actuated disengaged state.

As can also be seen in FIG. 2, the clutch setting cylinder CC in the illustrated embodiment is equipped with a sensor device 114 for detecting the position of the piston 20, which sensor device comprises a sensor 116 (for example, a Hall sensor) arranged at the cylinder housing 54 and a signal element 118 (for example, a permanent magnet) attached to the piston 20. The sensor device 114 is similarly electrically connected with the control unit ECU (indicated in FIG. 1 by dashed lines), which processes setting signals, for example in order to determine the respective actuation state of the clutch setting cylinder CC and/or to activate the detenting device 26 in dependence on the position of the piston 20. The clutch slave cylinder CS can also be provided with a sensor system 120, which is electrically connected with the control unit ECU, for the stroke of the slave piston 108, as shown in FIG. 1.

Finally, with regard to the gear setting section 16 with its four double-acting gear setting cylinders GC1 to GC4, which can be connected with the pressure lines 46, 48 hydraulically in parallel with respect to the pump P, it is to be emphasized here that the individual gear setting cylinders GC1 to GC4, as can be readily assumed from the schematic illustration in FIG. 1, are constructed very similarly to the clutch setting cylinder CC. In this case as well these are sensed setting cylinders, the pistons of which are selectably fixable or releasable by a respectively associated, resiliently biased detenting means, which is electromagnetically unlockable by way of the control unit ECU, in order to be displaced to the right or the left in FIG. 1 depending on the respective hydraulic loading of the pistons. However, the pistons of the gear setting cylinders GC1 to GC4 in the illustrated embodiment are each provided by contrast to the clutch setting cylinder CC according to FIG. 1 with three blocking recesses a1, b1, c1, a2, b2, c2, a3, b3, c3 or a4, b4, c4. Whereas the blocking recesses b1 to b4 each define a rest or neutral setting of the respective piston and of the gear setting element F1 to F4 operatively connected therewith, the remaining blocking recesses a1 to a4 and c1 to c4 each determine a specific engagement setting. In that case, detenting at a1 stands for an engaged forward gear G3, at a2 for an engaged reverse gear GR, at a3 for an engaged forward gear G6, at a4 for an engaged forward gear G5, at c1 for an engaged forward gear G1, at c2 for an engaged forward gear G2, at c3 for an engaged forward gear G4 and finally at c4 for an engaged forward gear G7. Further details, in particular constructional details, of such gear setting cylinders are evident from earlier U.S. Patent Publication No. 2013/0008156 A1, by the same applicant which is hereby incorporated by reference.

The following operation, for example, is possible with the afore-described hydraulic actuating device 10, wherein the control unit ECU suitably activates and coordinates the electric pump drive M and the electromagnetic actuators 32 of the detenting devices 26 at the setting cylinders CC, GC1 to GC4, optionally with consideration of sensed piston positions.

If the piston 20 of the clutch setting cylinder CC is displaced, for an actuating movement at the clutch master cylinder CM, from a predetermined setting, which in this embodiment is known by way of the sensor device 114, for example the rest setting according to FIGS. 1 and 2, then initially the actuator 32 of the detenting device 26 is supplied with power by way of the control unit ECU. As a consequence thereof the blocking element 28 is magnetically retracted against the force of the spring 30, in which case the detenting projection 76 comes free from the respective righthand recess 66 at the piston 20 so that the detenting is released. The pump drive M is now supplied with power by way of the control unit ECU in such a manner that the pump P starts up with that pumping direction R required for the desired setting movement direction, for example with a pumping direction R from the left of the pump P to the right of the pump P in FIG. 1 (pump rotates in clockwise sense). Consequently, hydraulic loading of the pressure chamber 60 in the clutch setting cylinder CC takes place and thus displacement of the piston 20 to the right in FIG. 1. After a short movement travel of the piston 20, power supply to the actuator 32 can be switched off so that the spring 30 seeks to displace the blocking element 28 downwardly in FIG. 1. This takes place as soon as the piston 20 has reached, with respect to the blocking element 28, a position which the detenting projection 76 can slide into the recess 68. The pump drive M is now switched off so that the system is again entirely free of current. In this mode and manner the piston 20 can be moved from one detenting setting to another detenting setting.

It will be apparent that in the overall system an actuating movement at the friction clutch C can be produced or a specific one of the gear setting elements F1 to F4 can be moved in that the control unit ECU through power supply of the detenting device 26 cancels the piston detenting at the setting cylinder CC or GC1 to GC4 associated with the friction clutch C or with the respective gear setting element F1 to F4 and switches on the pump P with the specific pumping direction R depending on the desired setting direction, while the pistons of the other setting cylinders are held, in power-free state, by way of the detenting devices functionally associated therewith. It is basically possible by this switching procedure to execute at the same time several setting movements in the same setting direction in that the corresponding detenting devices and the pump drive M are supplied with power at the same time, whereupon the pistons, which are loaded with pressure and freed, move in the same setting direction.

Clutch and gear-selection operations can accordingly be carried out in abbreviated description as follows:

A. Starting: The control unit ECU receives the signal for starting as well as data about the required dynamics from the superordinate transmission control. All electrical components apart from the travel sensors are without power, unless the contrary is stated; at the start, all setting cylinders CC, GC1 to GC4 are detented in rest setting (engagement in recesses 66 or b1 to b4).

A.1 For opening the friction clutch C the detenting device 26 at the clutch setting cylinder CC is supplied with power and the pump P is switched on for righthand rotation, whereupon the piston 20 in the clutch setting cylinder CC moves to the right and actuates the clutch master cylinder CM. The position of the piston 20 is in that case detected by way of the integrated sensor device 114. The clutch slave cylinder CS is thus hydraulically activated and opens the friction clutch C. In the end setting of the piston 20 the detenting device 26 is freed of power and thus holds the piston 20 in position (detenting projection 76 is in engagement with recess 68); the pump P is switched off.

A. 2 For engagement of the requisite gear insofar as the 1st forward gear G1 or the reverse gear GR is not already engaged the procedure is as follows. If the 1st forward gear G1 is engaged, the detenting device at the gear setting cylinder GC1 is supplied with power; the pump P is switched on again for righthand rotation. Accordingly, the piston in the gear setting cylinder GC1 travels to the left so that the 1st forward gear G1 is engaged by way of the gear setting element F1. The piston of the gear setting cylinder GC1 is then fixed in this position by relieving the associated detenting device of power (engagement in recess C1).

A. 3 For the actual starting process the pump P is initially operated with righthand rotation in order to relieve the detenting of the clutch setting cylinder CC. The detenting device 26 at the clutch setting cylinder CC is then supplied with power, the pump P is switched over to lefthand rotation and the piston 20 in the clutch setting cylinder CC moves under travel regulation in order to engage the friction clutch C in defined manner and thus start with the required dynamics in correspondence with the motor vehicle. When the rest setting is reached, the detenting device 26, freed of power, detents the piston 20 (detenting projection 76 is in engagement with recess 66); the pump P is switched off.

B. Gear change: The control unit ECU receives the signal for a gear change from the superordinate transmission control. All electrical components apart from the travel sensors are without power, unless otherwise stated; the clutch setting cylinder CC is detented in the rest setting and the gear setting cylinders GC1 to GC4 in their respective setting.

B. 1 For a gear change, initially the friction clutch C is opened as described above under A. 1.

B. 2 In order to disengage the 1st forward gear G1 the detenting device at the gear setting cylinder GC1 is supplied with power. The pump P is operated with lefthand rotation so that the gear setting element F1 is drawn to the right. When the piston of the gear setting cylinder GC1 has reached the middle setting it is fixed by relieving the associated detenting device of power (engagement in recess b1).

B. 3 In order to engage the 2nd forward gear G2 the detenting device at the gear setting cylinder GC2 is supplied with power. The pump P is operated with righthand rotation so that the gear setting element F2 is pushed to the left. When the piston of the gear setting cylinder GC2 has reached its lefthand setting it is fixed by relieving the associated detenting device of power (engagement in recess c2).

B. 4 In order to close the friction clutch C the pump P is initially operated in righthand rotation so that the detenting at the clutch setting cylinder CC is relieved. The detenting device 26 at the clutch setting cylinder CC is then supplied with power, the pump P is switched over to lefthand rotation and the piston 20 in the clutch setting cylinder CC is moved under travel regulation so that the friction clutch C is closed with the required dynamics. When the rest setting is reached, the detenting device 26 relieved of power detents the piston 20 (detenting projection 76 is in engagement with recess 66); the pump P is switched off.

The procedure is analogous for the other gears, so that explanations with respect thereto at this point are redundant.

The further embodiments according to FIGS. 3 to 5 shall be described in the following only to the extent that they differ from the first embodiment described above with reference to FIGS. 1 and 2. At the outset it is to be emphasized here that the further embodiments do not differ from the first embodiment with respect to the power units 12 and gear setting sections 16 and for that reason are not explained again; differences are present merely with respect to the design of the clutch actuating sections 18 and, in particular, as follows.

Figure 3:
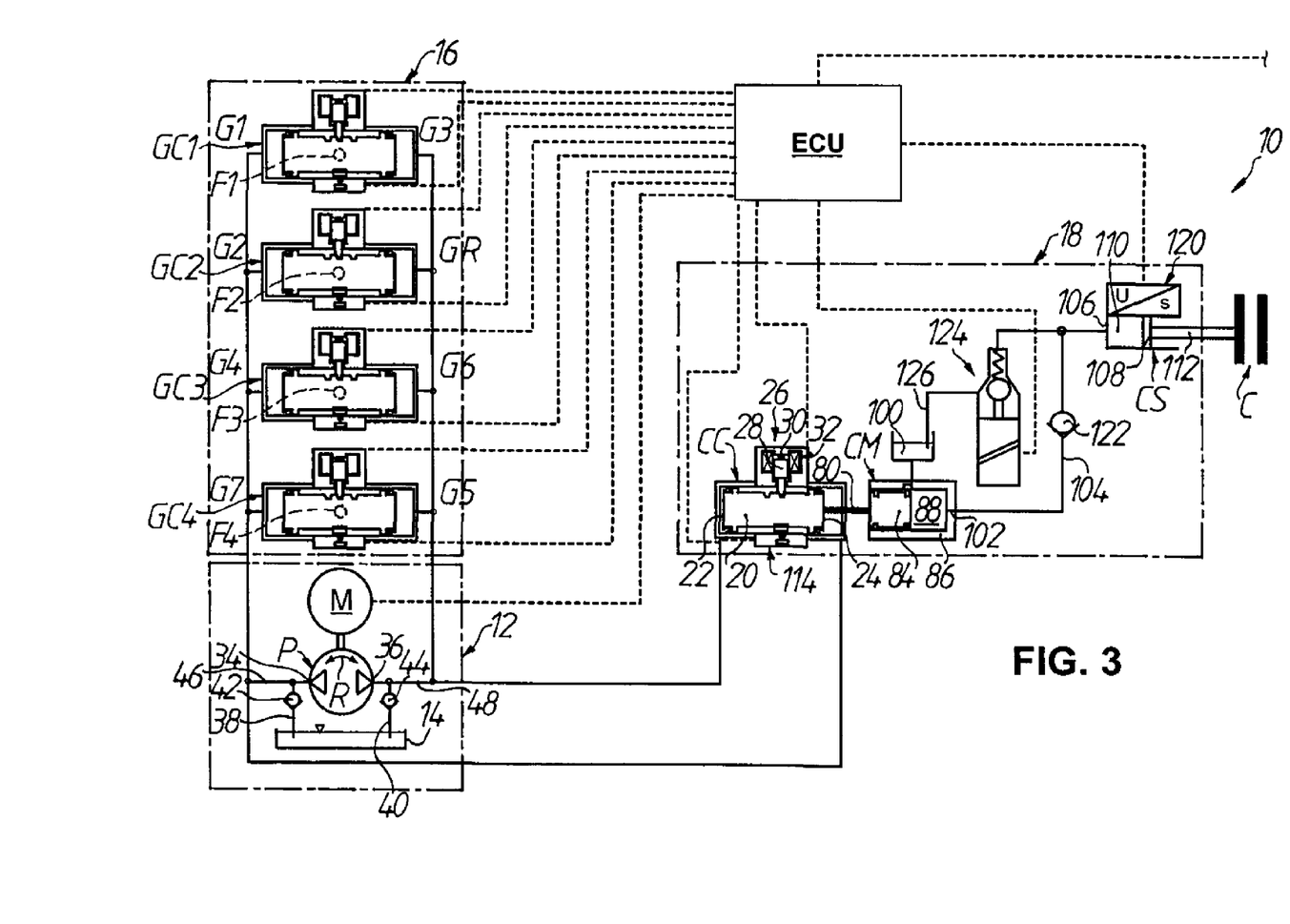
FIG. 3 shows a circuit diagram of a hydraulic actuating device for actuation of a friction clutch and of four gear setting elements in accordance with a second embodiment according to the invention, in which by comparison with the first embodiment the hydraulic connection between the clutch master cylinder and clutch slave cylinder is provided with a valve arrangement for setting pressure.

In the second embodiment according to FIG. 3, starting from the clutch master cylinder CM a non-return valve 122 blocking in the direction of the clutch master cylinder CM and an electromagnetically actuable proportional throttle valve 124 are connected into the pressure line 104 between the clutch master cylinder CM and the clutch slave cylinder CS. The hydraulic pressure in the clutch slave cylinder CS can be set in defined manner by the proportional throttle valve 124, which is electrically activatable by way of the control unit ECU and which is connected with the fluid reservoir 100 by way of an outflow line 126.

In the illustrated embodiment the proportional throttle valve 124 is executed as an electromagnetically actuable 2/2 ball-seat valve switched into a transition zero setting in the non-activated state, as is known in principle from DE-A-196 33 420 (FIG. 4) of the same applicant, which incorporation by reference is hereby made with respect to further details concerning the valve. Through electromagnetically produced retention of the valve body (ball), which is resiliently biased away from the valve seat, against the resilient force a throttle gap between valve seat and valve body can be closed or variably set, by way of which gap the hydraulic fluid can flow out from the pressure line 104 into the outflow line 126 so that the pressure, which is 'locked in' due to the non-return valve 122, in the clutch slave cylinder CS can be maintained or relieved or diminished in defined manner in direction towards the fluid reservoir 100.

Accordingly, for opening or disengaging the friction clutch C the proportional throttle valve 124 has to be supplied with power in order to close the latter so that a pressure can in any case build up in the clutch slave cylinder CS when the clutch master cylinder CM is, as described above, actuated by the clutch setting cylinder CC. In order to close or engage the friction clutch C it is then not necessary, by contrast to the first embodiment, to operate the pump P: rather, this can take place with fine sensitivity by suitable electrical activation of the proportional throttle valve 124 for variable setting of the throttle gap. However, the clutch setting cylinder CC at the same time or thereafter has to be brought back into its starting or rest state and, in particular, by canceling the detenting of the piston 20 in the actuation setting by power supply of the detenting device 26, displacement of the piston 20 by operation of the pump P in lefthand rotation and, finally, detenting of the piston 20 in the rest setting by relieving the detenting device 26 of power.

Figure 4:
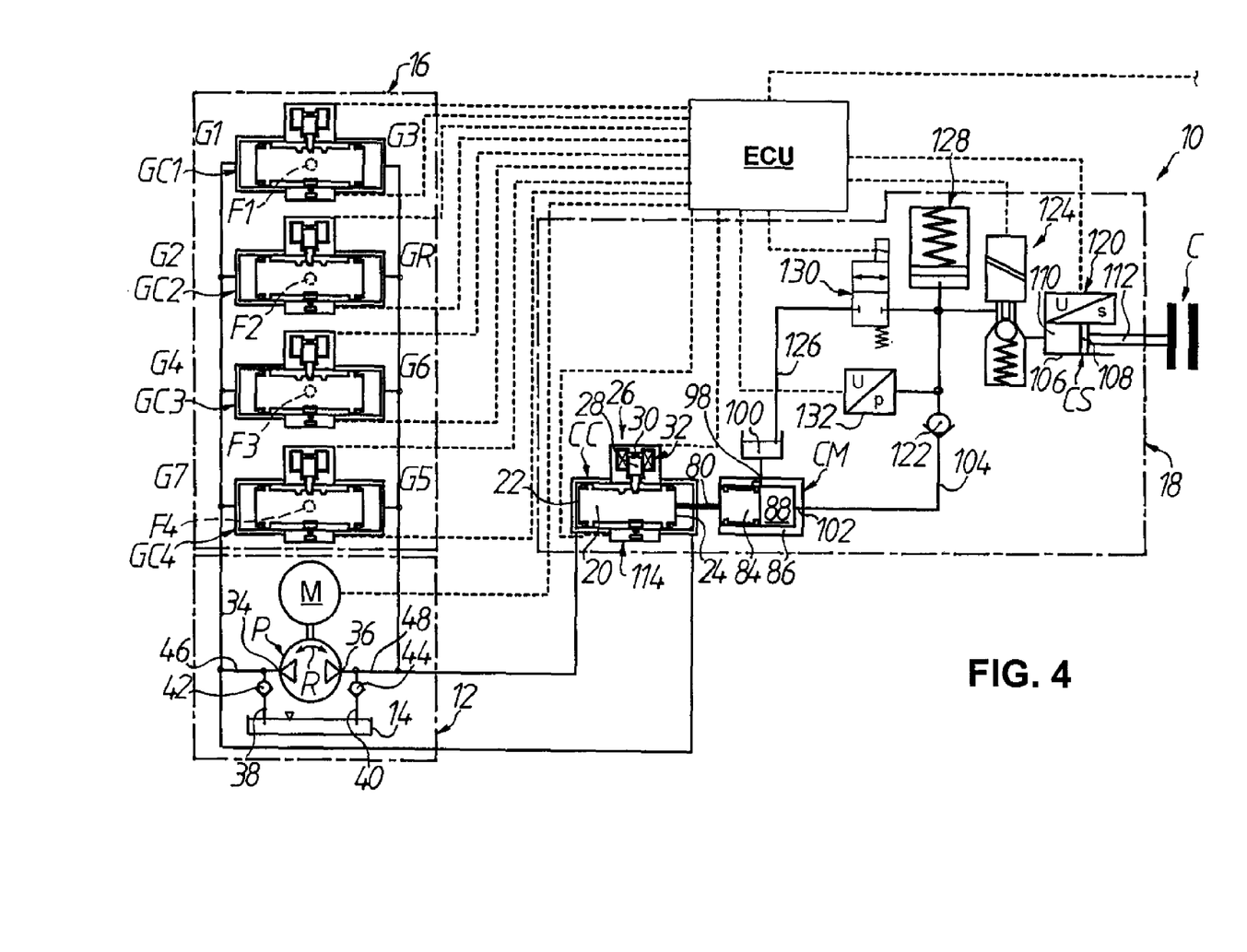
FIG. 4 shows a circuit diagram of a hydraulic actuating device for actuation of a friction clutch and of four gear setting elements in accordance with a third embodiment according to the invention, in which by comparison with the second embodiment the hydraulic connection between clutch master cylinder and clutch slave cylinder is provided with a different valve arrangement for pressure setting and a pressure store.

In the case of the third embodiment illustrated in FIG. 4, as well a non-return valve 122 and a proportional throttle valve 124, here again an electromagnetically actuable 2/2 ball-seat valve are connected in succession between the clutch master cylinder CM and the clutch slave cylinder CS. However, by contrast to the second embodiment the valve 124 is in a blocking zero setting in the non-activated state, i.e. the valve body is resiliently biased against the valve seat and has to be lifted, produced electromagnetically, off the valve seat against the resilient force in order to set the throttle gap in defined manner. In the illustrated circuit diagram according to FIG. 4 the proportional throttle valve 124 is so arranged that it acts, without power, like a resiliently biased non-return valve blocking in the direction of the clutch master cylinder CM. In addition, between the non-return valve 122 and the proportional throttle valve 124 a pressure store 128 is connected into the pressure line 104, which in addition is hydraulically connected between the non-return valve 122 and the proportional throttle valve 124 with the outflow line 126 by way of an electromagnetically actuable switching valve 130 resiliently biased to block in the non-activated state.

Finally, in FIG. 4 there is shown at 132 a pressure sensor, which like the switching valve 130 is electrically connected with the control unit ECU, for detecting the pressure in the pressure line 104, by which, for example, leakages can be recognized and which in principle can also be provided in the other embodiments. In the present circuit the pressure sensor 132 can advantageously also serve the purpose, in conjunction with the control unit ECU, of so supplying the proportional throttle valve 124 in defined manner with power in advance that the opening point thereof can be attained more rapidly.

With respect to operation of the actuating device 10 according to the third embodiment, it is to be noted at the outset that the switching valve 130 is, if the friction clutch C is not to be opened just yet, supplied with power periodically, i.e. at regular intervals, so as to ensure volume compensation, which can be required as a consequence of thermal expansions, etc.

The disengagement and engagement of the friction clutch C then takes place as follows: Initially, for filling the (spring) pressure store 128 the detenting device 26 is supplied with power and the pump P is switched on for righthand rotation so that the clutch setting cylinder CC actuates the clutch master cylinder CM. The resilient bias at the proportional throttle valve 124 is in that case of such a magnitude that the volume of hydraulic fluid displaced as a consequence of actuation of the clutch master cylinder CM is forced into the pressure store 128; the non-return valve 122 and the blocking switching valve 130 maintain the pressure. The pump P is then operated in lefthand rotation until the piston 20 reaches its rest setting. The clutch master cylinder CM then sucks hydraulic fluid out of the fluid reservoir 100 by way of the breather port 98 so that it is ready for the next actuation. In a given case, several such actuations of the clutch master cylinder CM by way of the clutch setting cylinder CC can take place until the pressure store 128 is sufficiently filled. The detenting device 26 is subsequently relieved of power and locks the piston 20 of the clutch setting cylinder CC; the pump P is switched off.

The opening or disengagement of the friction clutch C thereafter takes place solely through suitable power supply to the proportional throttle valve 124, in which case the pressure store 128 supplies the pressure required for actuation of the clutch slave cylinder CS.

For closing or engagement of the friction clutch C initially the switching valve 130 is supplied with power in order to connect the pressure line 104 with the outflow line 126. Finally, the proportional throttle valve 124 is suitably activated in order to hydraulically relieve the clutch slave cylinder CS in defined manner and in that case produce a travel-regulated disengaging movement.

Figure 5:
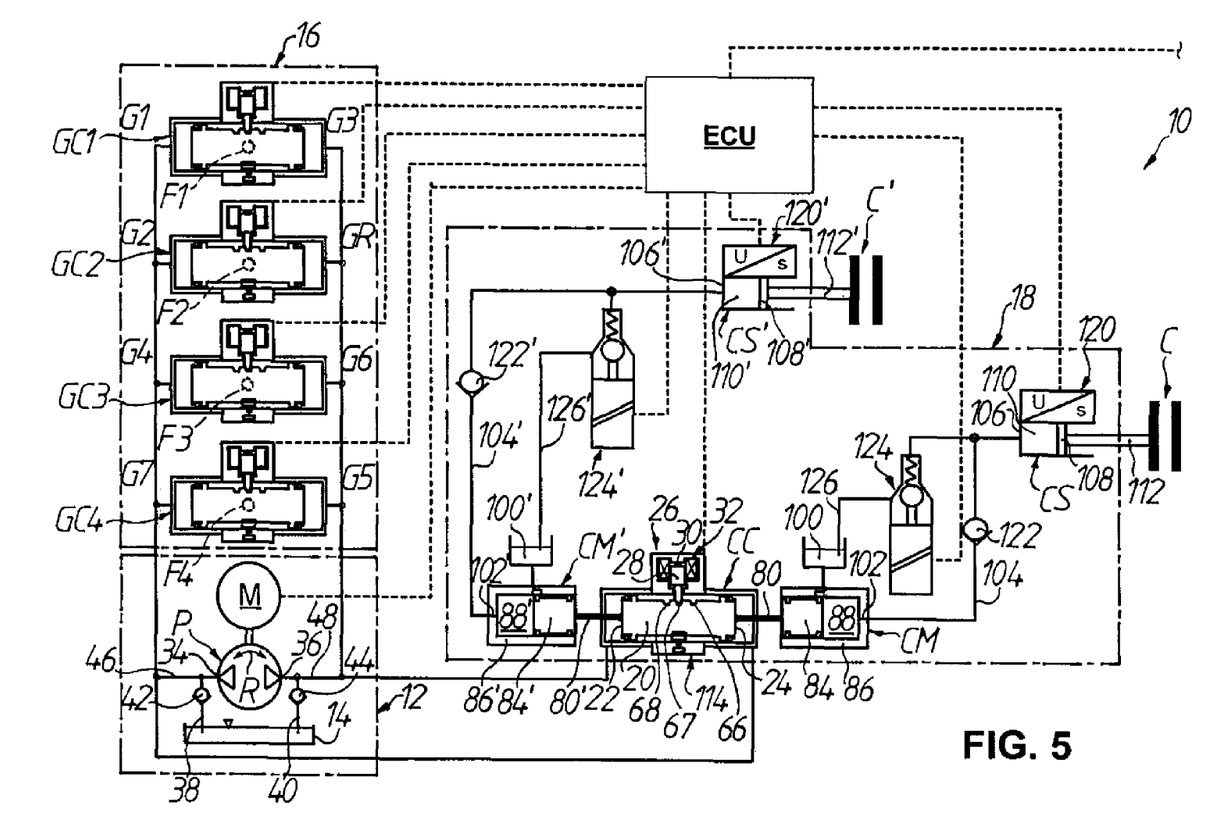
FIG. 5 shows a circuit diagram of a hydraulic actuating device for actuation of two friction clutches and four gear setting elements in a twin-clutch gearbox, as a fourth embodiment according to the invention, in which associated with each friction clutch is a serial connection of a clutch master cylinder and a clutch slave cylinder with a valve arrangement for pressure setting analogously to FIG. 3, wherein the clutch setting cylinder actuates both clutch master cylinders.

The fourth embodiment shown in FIG. 5 differs from the previously described embodiments essentially in that the piston 20 of the clutch setting cylinder CC is operatively connected on each of two opposite sides 22, 24 with respective friction clutches C, C'. The clutch setting cylinder CC can engage the one friction clutch C, which in a twin-clutch transmission can be associated with, for example, the even-numbered forward gears G2, G4 and G6 as well as the reverse gear GR, or the other friction clutch C', which in a twin-clutch transmission can be associated with, for example, the uneven-numbered forward gears G1, G3, G5 and G7. In that case, the piston 20 of the clutch setting cylinder CC is mechanically coupled on each of the two sides with a respective master piston 84, 84' of a clutch master cylinder CM, CM'. The respective further operative connection with respect to the friction clutch C or C' is formed as in the case of the second embodiment according to FIG. 3 so that to that extent reference can be made to the above description.

By contrast to the preceding embodiments a further recess 67 is additionally provided at the piston 20 so that this has, in total, three recesses 66, 67, 68. The middle recess 67 in that case defines the basic or rest setting of the piston 20 in the clutch setting cylinder CC, the recess 66 at the right in FIG. 5 defines the actuation setting of the piston 20 when the friction clutch C' is actuated and the recess 68 at the left in FIG. 5 defines the actuation setting of the piston 20 when the other friction clutch C is actuated. The detenting and displacement of the piston 20 takes place as already described above.

It will be evident to the expert that a coincident operation of the friction clutches C, C' is thus possible. If, for example, the gear is changed from the first forward gear G1 to the second forward gear G2 then the procedure can be starting from a state in which the friction clutch C' associated with the first forward gear G1 is closed, while the friction clutch C associated with the second forward gear G2 is kept open by the proportional throttle valve 124 being supplied with power as follows, described in abbreviated form:

C. 1 Engaging the second gear in 'free' part transmission: Supply detenting device at the gear setting cylinder GC2 with power; operate pump P with righthand rotation and thus engage the second forward gear G2; relieve detenting device at the gear setting cylinder GC2 of power and thus fix the corresponding setting cylinder piston (engagement in recess c2; cf. FIG. 1).

C. 2 'Coincidence' of the clutches: Supply detenting device 26 at the clutch setting cylinder CC and proportional throttle valve 124' with power; operate pump P in lefthand rotation and thus actuate the clutch master cylinder CM'; the latter hydraulically activates the clutch slave cylinder CS', which opens the friction clutch C'. Parallel thereto: regulated relief of the proportional throttle valve 124 of power so that the clutch slave cylinder CS is hydraulically relieved and the friction clutch C closed. In the (lefthand) end setting of the piston 20 in the clutch setting cylinder CC the detenting device 26 is relieved of power so that the piston 20 is held in position (engagement in recess 66).

C. 3 Disengagement of the 1st gear in the now 'free' part transmission: Supply detenting device at the gear setting cylinder GC1 with power; operate pump P in lefthand rotation, whereby the first forward gear G1 is disengaged; relieve detenting device at the gear setting cylinder GC1 of power, as soon as the corresponding setting cylinder piston has reached its middle setting, in which it is thus detented (engagement in recess b1; cf. FIG. 1).

C. 4 Producing initial setting of the clutch setting cylinder CC again: Parallel to or after disengagement of the first forward gear G1 the detenting device 26 is supplied with power and the pump P operated in lefthand rotation until the piston 20 has reached its rest setting, in which the detenting device 26 is relieved of power and thus detents the piston 20 (engagement in recess 67).

A change between the other gears can take place in analogous manner; explanations with respect thereto are for that reason redundant.

Variations and modifications are possible without departing from the scope and spirit of the present invention as defined by the appended claims.

I claim:

1. Hydraulic actuating device for actuation of at least one friction clutch and at least one gear setting element in a motor vehicle, comprising a power unit for generating a hydraulic pressure by use of a pump, which is drivable by way of an electric pump drive, in order to displace hydraulic fluid in a pumping direction, a gear setting section with a gear setting cylinder for the gear setting element which is hydraulically connected with the power unit, a clutch actuating section with a clutch setting cylinder which is hydraulically connected with the power unit and the piston of which is operatively connected with the friction clutch, and a control unit which is electrically connected with the pump drive and control elements for the gear setting section and the clutch actuating section, characterized in that;
 a detenting device with a blocking element is functionally associated, as a control element, with the piston, which can be hydraulically loaded on opposite sides, of the clutch setting cylinder the blocking element being resiliently biased into a blocking setting preventing movement of the piston and being movable against the resilient bias from the blocking setting into a release setting, which permits movement of the piston, by an actuator electrically activatable by the control unit, wherein the pumping direction of the pump is reversible in order to hydraulically load the piston of the clutch setting cylinder on one or the other side thereof for an actuating movement depending on the respective pumping direction, and wherein the control unit in order to disengage and engage the friction clutch, coordinates the electrical activation of said electric pump drive and said actuator in such a way that said control unit actuates said actuator before said control unit activates said electric pump drive to hydraulically load said piston of said clutch setting cylinder for permitting and providing movement of said piston.

2. Actuating device according to claim 1 further characterized in that the detenting device is mounted on the clutch setting cylinder, wherein the blocking element cooperates with blocking sections at the piston of the clutch setting cylinder so as to keep the piston in a rest setting or an actuation setting or to release it from the respective setting.

3. Actuating device according to claim 2 further characterized in that the blocking sections are formed at the piston of the clutch setting cylinder by axially spaced-apart recesses at the piston circumference.

4. Actuating device according to claim 3 further characterized in that the piston of the clutch setting cylinder is operatively connected on each of two opposite sides with a respective friction clutch so that one friction clutch or the other friction clutch is selectably actuable by the clutch setting cylinder.

5. Actuating device according to claim 4 further characterized in that the clutch setting cylinder comprises a sensor device for detecting the position of the piston, with a sensor arranged at the cylinder housing and a signal element attached to the piston.

6. Actuating device according to claim 5 further characterized in that the electrically activatable actuator is an electromagnetic actuator.

7. Actuating device according to claim 1 further characterized in that the piston of the clutch setting cylinder is operatively connected on each of two opposite sides with a respective friction clutch so that one friction clutch or the other friction clutch is selectably actuable by the clutch setting cylinder.

8. Actuating device according to claim 7 further characterized in that the clutch setting cylinder comprises a sensor device for detecting the position of the piston, with a sensor arranged at the cylinder housing and a signal element attached to the piston.

9. Actuating device according to claim 8 further characterized in that the electrically activatable actuator is an electromagnetic actuator.

10. Hydraulic actuating device for actuation of at least one friction clutch and at least one gear setting element in a motor vehicle, comprising a power unit for generating a hydraulic pressure by use of a pump, which is drivable by way of an electric pump drive, in order to displace hydraulic fluid in a pumping direction, a gear setting section with a gear setting cylinder for the gear setting element which is hydraulically connected with the power unit, a clutch actuating section with a clutch setting cylinder which is hydraulically connected with the power unit and the piston of which is operatively connected with the friction clutch, and a control unit which is electrically connected with the pump drive and control elements for the gear setting section and the clutch actuating section, characterized in that;
 a detecting device with a blocking element is functionally associated, as a control element, with the piston, which can be hydraulically loaded on opposite sides, of the clutch setting cylinder the blocking element being resiliently biased into a blocking setting preventing movement of the piston and being movable against the resilient bias from the blocking setting into a release setting, which permits movement of the piston, by an actuator electrically activatable by the control unit, wherein the pumping direction of the pump is reversible in order to hydraulically load the piston of the clutch setting cylinder on one or the other side thereof for an actuating movement depending on the respective pumping direction, and wherein the control unit coordinates the electrical activation of pump drive and actuator in order to disengage and engage the friction clutch;
 the detenting device is mounted on the clutch setting cylinder, wherein the blocking element cooperates with blocking sections at the piston of the clutch setting cylinder so as to keep the piston in a rest setting or an actuation setting or to release it from the respective setting;
 the blocking sections are formed at the piston of the clutch setting cylinder by axially spaced-apart recesses at the piston circumference;
 the piston of the clutch setting cylinder is operatively connected on each of two opposite sides with a respective friction clutch so that one friction clutch or the other friction clutch is selectably actuable by the clutch setting cylinder;
 the clutch setting cylinder comprises a sensor device for detecting the position of the piston, with a sensor arranged at the cylinder housing and a signal element attached to the piston;

the electrically activatable actuator is an electromagnetic actuator; and the piston of the clutch setting cylinder is mechanically coupled on at least one side with a master piston of a clutch master cylinder, which is hydraulically connected by way of a pressure line with a clutch slave cylinder with a slave piston, which is mechanically connected with the friction clutch.

11. Actuating device according to claim 10, characterized in that an equalizing reservoir for hydraulic fluid is associated with the clutch master cylinder wherein starting from the clutch master cylinder a non-return valve blocking in the direction of the clutch master cylinder and an electromagnetically actuable proportional throttle valve, which is connected with the equalizing reservoir by way of an outflow line and by which the hydraulic pressure in the clutch slave cylinder can be set in defined manner, are connected into the pressure line between the clutch master cylinder and the clutch slave cylinder.

12. Actuating device according to claim 11, characterized in that the proportional throttle valve in the non-activated state is disposed in a transition zero setting.

13. Actuating device according to claim 11, characterized in that between the non-return valve and the proportional throttle valve, which in the non-activated state is in a blocking zero setting, a pressure store is connected into the pressure line, which between the non-return valve and the proportional throttle valve is hydraulically connected with the outflow line by way of a switching valve which blocks in a non-activated state.

14. Hydraulic actuating device for actuation of at least one friction clutch and at least one gear setting element in a motor vehicle, comprising a power unit for generating a hydraulic pressure by use of a pump, which is drivable by way of an electric pump drive, in order to displace hydraulic fluid in a pumping direction, a gear setting section with a gear setting cylinder for the gear setting element which is hydraulically connected with the power unit, a clutch actuating section with a clutch setting cylinder which is hydraulically connected with the power unit and the piston of which is operatively connected with the friction clutch, and a control unit which is electrically connected with the pump drive and control elements for the gear setting section and the clutch actuating section, characterized in that;

a detenting device with a blocking element is functionally associated, as a control element, with the piston, which can be hydraulically loaded on opposite sides, of the clutch setting cylinder the blocking element being resiliently biased into a blocking setting preventing movement of the piston and being movable against the resilient bias from the blocking setting into a release setting, which permits movement of the piston, by an actuator electrically activatable by the control unit, wherein the pumping direction of the pump is reversible in order to hydraulically load the piston of the clutch setting cylinder on one or the other side thereof for an actuating movement depending on the respective pumping direction, and wherein the control unit coordinates the electrical activation of pump drive and actuator in order to disengage and engage the friction clutch the piston of the clutch setting cylinder is operatively connected on each of two opposite sides with a respective friction clutch so that one friction clutch or the other friction clutch is selectably actuable by the clutch setting cylinder;

the clutch setting cylinder comprises a sensor device for detecting the position of the piston, with a sensor arranged at the cylinder housing and a signal element attached to the piston;

the electrically activatable actuator is an electromagnetic actuator; and the piston of the clutch setting cylinder is mechanically coupled on at least one side with a master piston of a clutch master cylinder, which is hydraulically connected by way of a pressure line with a clutch slave cylinder with a slave piston, which is mechanically connected with the friction clutch.

15. Actuating device according to claim 14, characterized in that an equalizing reservoir for hydraulic fluid is associated with the clutch master cylinder wherein starting from the clutch master cylinder a non-return valve blocking in the direction of the clutch master cylinder and an electromagnetically actuable proportional throttle valve, which is connected with the equalizing reservoir by way of an outflow line and by which the hydraulic pressure in the clutch slave cylinder can be set in defined manner, are connected into the pressure line between the clutch master cylinder and the clutch slave cylinder.

16. Actuating device according to claim 15, characterized in that the proportional throttle valve in the non-activated state is disposed in a transition zero setting.

17. Actuating device according to claim 15, characterized in that between the non-return valve and the proportional throttle valve, which in the non-activated state is in a blocking zero setting, a pressure store is connected into the pressure line, which between the non-return valve and the proportional throttle valve is hydraulically connected with the outflow line by way of a switching valve which blocks in a non-activated state.

18. Hydraulic actuating device for actuation of at least one friction clutch and at least one gear setting element in a motor vehicle, comprising a power unit for generating a hydraulic pressure by use of a pump, which is drivable by way of an electric pump drive, in order to displace hydraulic fluid in a pumping direction, a gear setting section with a gear setting cylinder for the gear setting element which is hydraulically connected with the power unit, a clutch actuating section with a clutch setting cylinder which is hydraulically connected with the power unit and the piston of which is operatively connected with the friction clutch, and a control unit which is electrically connected with the pump drive and control elements for the gear setting section and the clutch actuating section, characterized in that;

a detenting device with a blocking element is functionally associated, as a control element, with the piston, which can be hydraulically loaded on opposite sides, of the clutch setting cylinder the blocking element being resiliently biased into a blocking setting preventing movement of the piston and being movable against the resilient bias from the blocking setting into a release setting, which permits movement of the piston, by an actuator electrically activatable by the control unit, wherein the pumping direction of the pump is reversible in order to hydraulically load the piston of the clutch setting cylinder on one or the other side thereof for an actuating movement depending on the respective pumping direction, and wherein the control unit coordinates the electrical activation of pump drive and actuator in order to disengage and engage the friction clutch; and the piston of the clutch setting cylinder is mechanically coupled on at least one side with a master piston of a clutch master cylinder, which is hydraulically connected by way of a pressure line with a clutch slave cylinder with a slave piston, which is mechanically connected with the friction clutch.

19. Actuating device according to claim 18, characterized in that an equalizing reservoir for hydraulic fluid is associated with the clutch master cylinder wherein starting from the clutch master cylinder a non-return valve blocking in the direction of the clutch master cylinder and an electromagnetically actuable proportional throttle valve, which is connected with the equalizing reservoir by way of an outflow line and by which the hydraulic pressure in the clutch slave cylinder can be set in defined manner, are connected into the pressure line between the clutch master cylinder and the clutch slave cylinder.

20. Actuating device according to claim 19, characterized in that the proportional throttle valve in the non-activated state is disposed in a transition zero setting.

21. Actuating device according to claim 19, characterized in that between the non-return valve and the proportional throttle valve, which in the non-activated state is in a blocking zero setting, a pressure store is connected into the pressure line, which between the non-return valve and the proportional throttle valve is hydraulically connected with the outflow line by way of a switching valve which blocks in a non-activated state.

* * * * *